Figure 1:
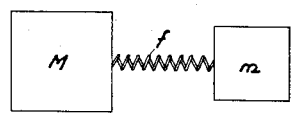

March 31, 1931.  A. YTTERBERG  1,798,922

MEANS FOR SUPPRESSING VIBRATIONS

Filed Nov. 14, 1929

Inventor.
Arle Ytterberg.
per Wm Wallace White.
Attorney.

Patented Mar. 31, 1931

1,798,922

UNITED STATES PATENT OFFICE

ARLE YTTERBERG, OF HOGBERGET, SWEDEN, ASSIGNOR TO ALLMÄNNA SVENSKA ELEKTRISKA AKTIEBOLAGET, OF VASTERAS, SWEDEN, A CORPORATION OF SWEDEN

MEANS FOR SUPPRESSING VIBRATIONS

Application filed November 14, 1929, Serial No. 407,122, and in Sweden November 23, 1928.

It is a well-known fact that vibrations in certain parts of machinery and apparatus often constitute a source of great inconvenience and therefore in many cases must be suppressed by some appropriate means. In many cases, the vibrations are of irregular character, or they depend on elastic action in the interior of the parts in question. In both these cases, the most common way of suppressing the vibrations is to introduce frictions of various character. The function of many parts of machinery and apparatus are, however, such that frictional means of the said kind cannot be properly applied. There exists also a class of impressed vibrations the characteristic feature of which is a certain definite frequency. Such vibrations occur for instance in machines running at a constant speed and in a more or less pronounced degree in all machinery and apparatus influenced by electric alternating current.

In machinery or apparatus which are exposed to such impressed vibrations of a certain frequency, it has generally been regarded as very dangerous to dimension any part of the machine or apparatus so as to obtain a proper frequency of oscillation that is in resonance with the said impressed frequency. It may also be regarded as indisputable, that such a dimensioning is very inappropriate for parts which serve to perform or transmit operative motion. On the other hand I have found, that if a body which is subjected to a pulsating force of a certain frequency, which is not the proper swinging frequency of said body, is resiliently connected to another body which has no other function than to swing freely, and which has a proper frequency of oscillation with respect to the first-named body equal to the disturbing frequency, the said freely swinging body will be able to entirely absorb all oscillations of this frequency and thus to entirely relieve the first-named body thereof.

An arrangement of this kind forms the object of the present invention. The latter can be applied in any case where disturbing pulsations of a definite frequency occur in impressed forces, but is of particular importance where the members influenced by the said pulsations are particularly sensitive therefor, for instance where they are adapted to swing freely with some other frequency, and still more particularly where they are arranged to operate electrical contacts. An example of such arrangement is presented by electric regulators which alternately close and break contacts at a certain frequency, for instance for intermittently short-circuiting a resistance.

Figure 2:
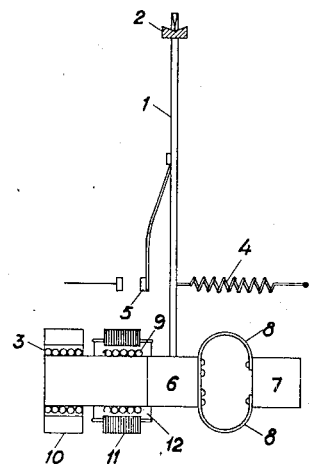

The invention is illustrated in the accompanying drawing where Fig. 1 diagrammatically illustrates the principle of the invention and Fig. 2 an application thereof.

Referring to Fig. 1, M represents the first body which is subjected to impressed forces, and $m$ the second body which is connected to the former by resilient means $f$. In the following equations, which serve to prove the correctness of the aforesaid even in such cases where the first body is subjected to external forces of different frequencies, the following symbols are used:

$M$ = mass of first body.
$m$ = mass of second body.
$P$ = amplitude value ⎫ of the one force component.
$w$ = circular frequency ⎭
$p$ = amplitude value ⎫ of the other force component.
$o$ = circular frequency ⎭
$f$ = ratio between elastic force and compression in the spring connection between the bodies.
$x$ = path of first body.
$y$ = path of second body.
$t$ = time.

The differential equations of motion of the two bodies will then be:

$$M\frac{d^2x}{dt^2} = P \sin wt + p \sin ot - f(x-y),$$

$$m\frac{d^2y}{dt^2} = f(x-y).$$

An elimination of $y$ between these equations gives $$Mm\frac{d^4x}{dt^4} + f(M+m)\frac{d^2x}{dt^2} = (f-mw^2)P \sin wt + (f-mo^2)p \sin ot.$$

Neglecting the exponential terms which disappear in the stationary condition, the integral of this equation will be:

$$x = \frac{f-mw^2}{Mmw^4 - f(M+m)w^2} P \sin wt + \frac{f-mo^2}{Mmo^4 - f(M+m)o^2} p \sin ot,$$

which can be readily checked by derivation.

If $f = mo^2$, which represents the condition for resonance of the second body with respect to the first one, the second term in the expression for $x$ will be zero, that is, the motion of the first body will have no component of the circular frequency $o$. By such dimensioning all vibrations of this frequency are thus eliminated for the first body.

By eliminating $x$ instead of $y$ in the original system of equations, the oscillations of the second body, the resonance body, are obtained. The denominators in the expression for $y$ will be the same as for $x$, and hence it is clear that none of the denominators becomes zero for $f=mo^2$ and thus the oscillations of the second body are kept between reasonable limits, although full resonance prevails with respect to the first body. The dangerous frequency has a higher value, for instance $$o\sqrt{2}$$

in the case of $M=m$.

At least in the case of the impressed force varying at a single frequency, the result above specified can be derived in a more elementary way. It is obvious, that if the second body only can be caused to oscillate in such a manner, that the acceleration and retardation forces acting thereon from the spring in any moment exactly equilibrate the forces acting on the first body with the frequency $o$, this body will behave as unaffected by these forces. The condition for this is that the second body oscillates with the frequency $o$ and with a certain amplitude and phase. By reason of the damping action which never can be avoided, the motion in the stationary state regulates itself so as to make the resultant movements a minimum, and this corresponds to the aforesaid conditions of motion.

The nature of the connection between the two masses must vary in accordance with the nature of the pulsations to be neutralized. If the latter for instance consist of pulsations of a torque, the masses must be rotatable with respect to each other. In most cases, however, the forces act in a more or less constant direction so that the motion between the two masses will be rectilinear. As slideways for guiding the masses with respect to each other will generally cause too much damping by friction, it is generally preferred to connect the masses together by leaf springs. Such springs afford sufficient guiding for the second body while in the same time permitting it to swing freely in the direction of pulsations.

Fig. 2 shows such a form of the invention. 1 is a pendulum suspended in knife edge bearings 2 and adapted to swing about a mean position under the influence of current-carrying coils 3, 9, moving respectively in the air gaps in magnets 10, 11, respectively. The magnet 10 is a permanent magnet, and the current traversing the coil 3 movable therein is assumed to be a low frequency alternating current or a pulsating direct current serving to keep the pendulum in oscillation at a corresponding frequency. The magnet 11, on the contrary is an electromagnet excited by a coil 12 fed by alternating current of commercial frequency which also traverses the coil 9. A spring 4 counteracts the force acting on the coil and a contact 5 is alternately closed and broken by the oscillating pendulum. The arrangement is that common in a certain class of voltage regulators and particularly in the type of such regulators described in the U. S. patent specification No. 1,657,056.

The fluctuations of the forces impressed on the pendulum by the current in the coil 3 are those serving to keep the pendulum in motion and are thus desirable. On the contrary, the forces impressed by the coil 9 contain a nondesirable oscillating component which is likely to cause an irregular operation of the contacts 5. In order to eliminate the action of this component as regards the main mass of the pendulum—which is diagrammatically illustrated as a weight 6, although in practice the said mass is generally distributed over the coils and connections therebetween—the pendulum is connected to a freely swinging mass 7 by a pair of bent leaf springs 8. For eliminating even any reaction forces in the bearings of the pendulum pulsating with the high frequency, it is of importance that the point of application of the resultant force from the springs 8 on the pendulum lies at the same distance from its axis of oscillation as the point of application of the pulsating force from the coil 9, as shown in the drawing. Since it is generally impossible to make the pendulum sufficiently rigid for neglecting its internal vibrations, it is also of importance that the leaf springs shall exert no bending action thereon, and for this reason the center of gravity of the mass 7 and the middle point between the points of application of the springs 8 should also lie at substantially the same distance from the axis of oscillation of the pendulum.

I claim as my invention:

1. In combination, a movable body having a certain natural frequency of oscillation, means for imparting to said body oscillations of another frequency, and a second body connected to the first body by resilient means so as to obtain with respect to said first body a natural frequency of oscillation equal to said other frequency.

2. In combination, a movable body having a certain natural frequency of oscillation, contact means carried by said body, means for imparting to said body oscillations of another frequency, and a second body connected to the first body by resilient means so as to obtain with respect to said first body a natural frequency of oscillation equal to said other frequency.

3. In combination, a body capable of oscillating about an axis at a certain natural frequency, means applied at a certain distance from said axis for imparting to said body oscillations of another frequency, and a second body connected to the first body by resilient means applied at the same mean distance from said axis of oscillation as said oscillating means so as to obtain with respect to said first body a natural frequency of oscillation equal to said other frequency.

4. In combination, a movable body having a certain natural frequency of oscillation, means for imparting to said body oscillations of another frequency, and a second body connected to the first body by leaf springs so as to obtain with respect to said first body a natural frequency of oscillation equal to said second frequency.

5. In combination, a movable body having a certain natural frequency of oscillation, a coil carried by said body and adapted to be excited by a current pulsating with said frequency, a stationary magnet in operative relation with said coil, another coil carried by said body and adapted to be excited by a current of another frequency, a stationary electromagnet in operative relation therewith, and a second body connected to said first body by resilient means so as to obtain with respect to said first body a natural frequency of oscillation equal to said second frequency.

6. In combination, a movable body having a certain natural frequency of oscillation, a coil carried by said body and adapted to be excited by a current pulsating with said frequency, a stationary magnet in operative relation with said coil, contact means carried by said body and adapted to be closed and opened at intervals determined by said oscillation, alternating current electromagnetic means associated with and affecting said body, and a second body resiliently connected to said first body so as to obtain with respect to said first body a natural frequency of oscillation equal to the frequency of pulsation of the forces caused by the alternating current electromagnetic means.

7. In combination, a body capable of oscillation, electromagnetic means carried by said body and adapted to be excited by a current pulsating with a certain frequency to maintain said oscillation, contact means carried by said body and adapted to be closed and opened at intervals determined by said oscillation, alternating current electromagnetic means associated with and affecting said body, and a second body resiliently connected to said first body so as to obtain with respect to said first body a natural frequency of oscillation equal to the double frequency of the alternating current.

In testimony whereof I have signed my name to this specification.

ARLE YTTERBERG.